US005406856A

United States Patent [19]

Kühn

[11] Patent Number: 5,406,856

[45] Date of Patent: Apr. 18, 1995

[54] PIPETTING APPARATUS

[75] Inventor: Günther Kühn, Hamburg, Germany

[73] Assignee: Eppendorf-Netheler Hinz, Hamburg, Germany

[21] Appl. No.: 218,044

[22] Filed: Mar. 25, 1994

Related U.S. Application Data

[63] Continuation of Ser. No. 988,422, Dec. 10, 1992, abandoned.

[30] Foreign Application Priority Data

Dec. 17, 1991 [DE] Germany ........................ 41 41 608.2

[51] Int. Cl.[6] ................................................ G01N 1/14

[52] U.S. Cl. ................................ 73/864.14; 73/864.11

[58] Field of Search ........... 73/864.01, 864.11, 864.12, 73/864.14, 864.16, 864.18; 422/100; 222/288, 209, 309; 128/765, 767; 141/24; 436/180

[56] References Cited

U.S. PATENT DOCUMENTS

| | | | |
|---|---|---|---|
| 917,442 | 4/1909 | Hutchinson | 73/864.11 |
| 2,595,493 | 5/1952 | Slaby et al. | 73/864.11 |
| 3,786,683 | 1/1974 | Berman et al. | 73/864.11 |
| 3,982,438 | 9/1976 | Byrd . | |
| 3,991,617 | 11/1976 | d'Autry | 73/864.14 |
| 4,009,611 | 3/1977 | Koffer et al. | 73/864.14 |
| 4,023,716 | 5/1977 | Shapiro | 73/864.14 |
| 4,047,438 | 9/1977 | Sekine . | |
| 4,158,035 | 6/1979 | Haase et al. . | |
| 4,195,526 | 4/1980 | Amos et al. | 73/864.11 |
| 4,210,026 | 7/1980 | Amos et al. . | |
| 4,296,071 | 10/1981 | Weiss et al. | 73/864.11 |
| 4,444,062 | 4/1984 | Bennett et al. . | |
| 4,527,437 | 7/1985 | Wells | 73/864.11 |
| 4,616,514 | 10/1986 | Magnussen, Jr. et al. | 73/864.14 |
| 4,818,706 | 4/1989 | Starr | 73/864.11 |

FOREIGN PATENT DOCUMENTS

| | | | |
|---|---|---|---|
| 0028478 | 2/1985 | European Pat. Off. . | |
| 0095401 | 2/1989 | European Pat. Off. . | |
| 7033438 | 12/1970 | Germany . | |
| 2120719 | 4/1971 | Germany . | |
| 86954 | 1/1972 | Germany . | |
| 249415 | 12/1988 | Germany . | |
| 778546 | 2/1956 | United Kingdom . | |
| 8404056 | 10/1984 | WIPO | 422/100 |

*Primary Examiner*—Robert Raevis
*Attorney, Agent, or Firm*—Anderson Kill Olick & Oshinsky

[57] ABSTRACT

A pipetting apparatus comprising a case and a receptacle formed therein, a pipette tip having a tube-like tip portion with a tip opening for fluid flow from the outside to the inside and vice versa and a deformable portion which is assembled with the tip portion to a unit, the pipette tip being placed in the receptacle with its tip portion projecting outwardly and the pipette tip being detachably connected with the case, an actuating device and an adjusting device coupled thereto which rests against the outside of the deformable portion to press or release the deformable portion and a work volume provided therein which is opened towards the tip opening according to an acuation of the actuating device, whereby the inner width of the undeformed deformable portion exceeds the inner width of the tip opening and that the adjusting device deforms the deformable portion about the whole deformation range of the work volume principally in transverse direction.

17 Claims, 8 Drawing Sheets

PIPETTING APPARATUS

This is a continuation application of Ser. No. 07/988,422, filed Dec. 10, 1992, now abandoned.

BACKGROUND OF THE INVENTION

1. Field of the Invention

The invention relates to a pipetting apparatus.

2. Description of the Related Art

A pipette of the mentioned kind is known from DE 25 49 477. In this, the closed work volume is formed in a cylinder and adjustable by moving an inserted piston. A linkage which is actuable by a button which can be thrown in works as an adjustment device. The work volume communicates with the hollow space of a detachable pipette tip so that by actuating the button liquid can be ejected or taken in by a lower tip opening. However, this piston travel pipette has the disadvantage that liberated contaminated vapors or aerosols of the probe liquid can reach into the upper cylinder space and can be delivered again out of control during the following steps of delivery together with probe material newly taken in. Subsequently, an encroachment of the following probes by contamination is possible even when the pipette tip is changed.

For overcoming these disadvantages, it already was proposed to arrange an exchangeable filter within the connecting region of pipette tip and pipetting apparatus. However, this solution uses an additional component, the filter, and is still unperfect with regard to the shielding of the work volume. Especially, it can be difficult to determine the right moment for exchanging the filter when reaching its maximum absorption capacity. An absolute contamination protection from the upper dose range is impossible.

Another suggestion for a pipetting appratus being shielded against contamination is known from the EP-A-0 077 180. Accordingly, the pipette tip is sealed by an annular sealing at the pipetting apparatus and has a capillary with a piston rod slidable in place. A piston with a seal element is attached removably to the piston rod, whereby the total length of this seal element must be at least twice the cylinder cross section. Prior to each sampling, a new pipette tip has to be mounted including piston rod to connect with the piston. Thus, several disposable parts are to be handled at each exchange of the dosing elements. The outer tip contour as well as the control unit of the piston are to be adapted carefully.

From U.S. Pat. No. 4,210,026, an apparatus for blood test sampling is known. Into this is insertable a one-ended sealed flexible envelope between a rigid and a hinged member. A rolling wheel is movable along the hinged member to compress the envelope progressively. When the wheel is retracted, the envelope can expand again, whereby the blood sample is drawn in. In this apparatus, the envelope is held safely only when it is compressed about its total length by the hinged member. Otherwise, it can float between the hinged and the rigid member, impeding the uptake of the sample. If the free space between the two members is opened relatively wide, the envelope may drop out. From the outside, it is difficult to observe whether it is held securely in the apparatus. Eventually, the sample volume drawn in is influenced by a certain variability of the arrangement of the envelope to the apparatus. Therefore, exact metering is impossible with the blood test sampling apparatus.

SUMMARY OF THE INVENTION

It is the object of the invention to improve a pipetting apparatus so that handling is facilitated and better metering is yielded at improved absence of contamination.

In a pipetting apparatus according to the invention, the variable work volume is not predefined by a cylinder with inserted piston as in a piston travel pipette. Instead, it is provided within a deformable portion of the pipette tip and variable by deformation thereof by an adjusting device. Therefore, compressing the work volume affects the content of the pipette tip to be pressed out of the tip opening and expanding the deformable portion results in drawing in a fluid through the tip opening. This allows that the pipette tip is only opened towards the tip opening when the work volume is compressed or expanded so that liquid, vapor or aerosols can only escape there. After use, the pipette tip including the deformable portion is disposed so that no contamination of the pipetting apparatus is possible due to lack of contact thereof with contaminated substance.

The clearance of the undeformed deformable portion exceeds the clearance of the tip opening. Moreover, the deformable portion is deformed about the total deformation range of the work volume by the adjusting device principally in transverse direction. Hereby the deformable portion has advantageous elastic deformation features and yields a deformation featuring the placing, fixing and metering of the pipette tip. Namely, if the adjusting device is not actuated for a deformation, then the pipette tip can be shifted with its deformable portion in longitudinal direction into the operating range of the adjusting device. Then, by actuating the adjusting device, the deformable portion can be deformed in principle about its total length in transverse direction, whereby the pipette tip is securely fixed to the pipetting apparatus. The pipette tip is relatively rigid in the region of the tip portion so that its alignment to the pipetting apparatus is practically not influenced by the deformation of the deformable portion. Therefore, the tip opening of less clearance can be safely aimed and approached to a sample which even may occur as a drop. Besides a fixation of the pipette tip, a predeformation of the deformable portion yields a compensation of misalignments between the deformable portion and the adjusting device. Then, the deformation for taking up a sample follows the predeformation. This allows a very exact metering of samples which may comprise very different volumina because of the large uptake cross section of the pipette tip.

Preferably, the deformable portion is a bulb portion so that the pipette tip is hermetically sealed everywhere outside the tip opening. In any case, it can be of cylindrical form which particularly favours the insertion of the pipette tip into a pipetting apparatus with a slim rod-like case. Furthermore, a bellow embodiment with deformability in transverse direction is possible. Generally, a form with at least one arbitrary preferred deformation direction can be used.

The pipette tip can have a conical tip portion which can receive an increased sample quantity in its enlarged hollow space. Thus, the suction of samples into the deformable portion and bubbling effects connected therewith can be avoided. An annular flange between the deformable portion and the tip portion can facilitate the handling of the pipette tip and its reproducible positioning as well as the final disposing by an annular ejecting device gripping under the annular flange. Preferably, the receptacle has an opening for axially introducing the deformable portion and an inner contour matching the outer contour of the inserted deformable portion.

Preferably, the adjusting device comprises a metering cylinder with a metering (proportionating) piston guided therein for deforming the deformable portion, whereby the metering piston is movable by a metering organ of the actuation device. For a simple force transition it is sufficient when the actuation device is coupled to the metering piston by a linkage. The linkage can comprise a stroke limiter which has a linkage-fixed stop flange and end stops on both sides of the stop flange fixed at the case and spaced apart from each other. The end stops limit the movement of the stop flange and the movement of the linkage-fixed stroke piston and thus, the pipettable sample volume is limited. Moreover, the end stop distance can be variable by an adjustment gear for adjusting the pipetting volume.

After connecting the pipette tip to the apparatus tolerance-caused misalignments between deformation portion and adjusting device can arise. Therefore, preferably the actuation and adjusting devices have predeformation devices for predeforming the deformable portion. Because of predeforming the deformable portion, influences of the tolerances on further deformation thereof are negligable and do not impair sample metering. For this purpose, the predeforming devices can comprise a predeforming piston for predeforming the deformable portion. The predeforming piston can act on the deformable portion like the metering piston.

In a preferred, very space-saving construction the predeforming piston and the metering piston are arranged coaxially within a common cylinder. Predeforming piston and metering piston can also be parallel to each other within a predeforming cylinder and a metering cylinder.

For example, metering piston and/or predeforming piston can act directly on the deformable portion. However, for a uniformly engaging deformation force, it is preferred that the pistons act on the deformable portion by means of a displacement fluid. Preferably, the displacement fluid is an incompressable medium such as brake or another hydraulic fluid.

Fundamentally, the displacement fluid acts directly on the deformable portion and care must be taken for an appropriate sealing of the pipette tip in the pipetting apparatus. In a preferred embodiment, the adjusting device comprises a displacement device made of flexible material with a receptacle for the deformable portion, the displacement device having at least one sealed chamber for the displacement fluid. Then, the pipette tip with the deformable portion is insertable into the receptacle of the displacement device which exerts a deformation force to the deformable portion when pressure is raised in the chamber by means of the displacement fluid. At raise of pressure in the predeforming device by means of the displacement fluid, the pipette tip is fixed in the receptacle, the walls of which lying close to the deformable portion. The displacement apparatus is preferably supported in the case at rigid abutment faces so that the pressure in the chamber affects primarily a deformation of the receptacle with the inserted deformable portion. If the chamber extends around the receptacle in its insertion direction, the maximum deformability of the deformation portion perpendicularly to its insertion axis resp. in radial direction is assured.

For compensation of metering errors due to material deformation and for reproducible sample metering, the deformable portion and/or the displacement device can be made of elastic material. The displacement device particularly can be made of rubber or another construction material which is chemically resistant and insusceptible to age. Preferably, the pipette tip is made of a polyolefine which allows for reversible redeformation because of its elasticity.

For further prohibition of undesired contamination the pipette tip can be engageable by an ejector which is actuable by means of an ejection organ and shifts the pipette tip into a release position when actuated. Touching the pipette tip is avoided when actuating the ejection organ. Preferably, the ejector abuts to the annular flange of the pipette tip with a ring portion.

BRIEF DESCRIPTION OF THE DRAWINGS

The invention will be discussed hereafter in more detail in terms of a preferred embodiment with reference to the accompanying drawings wherein.

FIGS. **13*a*–13*g* show a part-sectional cut through the reception region with the pipette tip of a pipette apparatus according to the invention in different phases of operation.

DESCRIPTION OF THE PREFERRED EMBODIMENTS

In the description of the different pipettes identical reference numbers for the parts of the same naming will be used.

Figure 1:
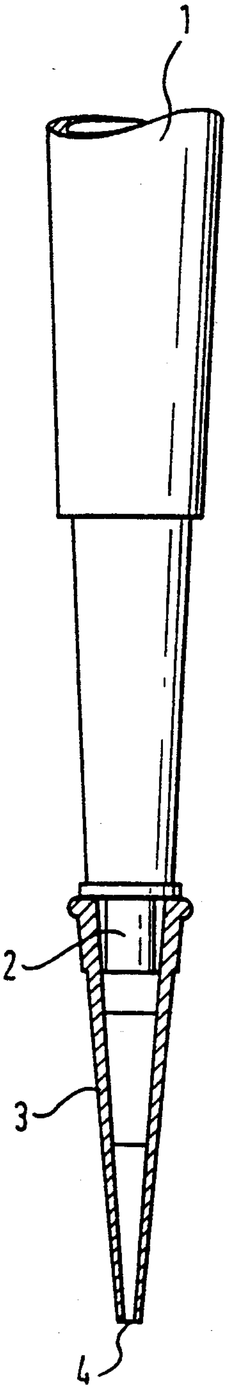
Fig. 1 PRIOR ART
FIG. 1 shows a usual stroke piston pipette with detachable pipette tip in side elevation view.
Figure 2:
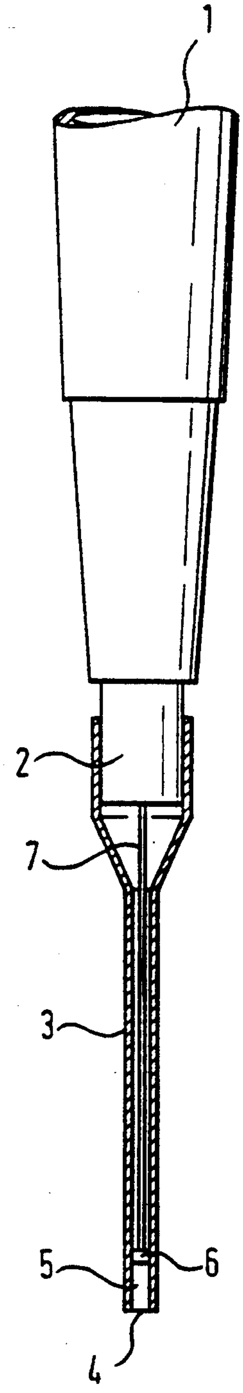
Fig. 2 PRIOR ART
FIGS. 2 and 3 show a usual stroke piston pipette with detachable capillary pipette tip in side elevation view and in selective enlargement of the tip region.
Figure 3:
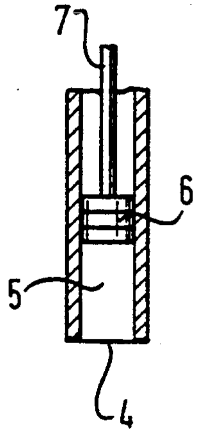
Fig. 3 PRIOR ART

Usual pipettes according to FIGS. 1 to 3 have at the front end of a case 1 a plug stub 2 to which a pipette tip 3 is attached with a widened end. The receptacle 10 is supported against the rigid abutment faces of the cage 1. According to FIG. 1, a work volume is arranged within case 1 which communicates with the pipette tip 3 and its tip opening 4 by the plug stub 2. For protecting the work volume against contamination a filter in the transition region of plug stub 2 and pipette tip 3 can be arranged.

According to FIGS. 2 and 3, the work volume 5 is within the capillary pipette tip 3 and is limited to the case 1 by a piston 6 on a thin piston rod 7. Both apparatuses are not satisfactory due to handling and freedom of contamination.

Figure 4:
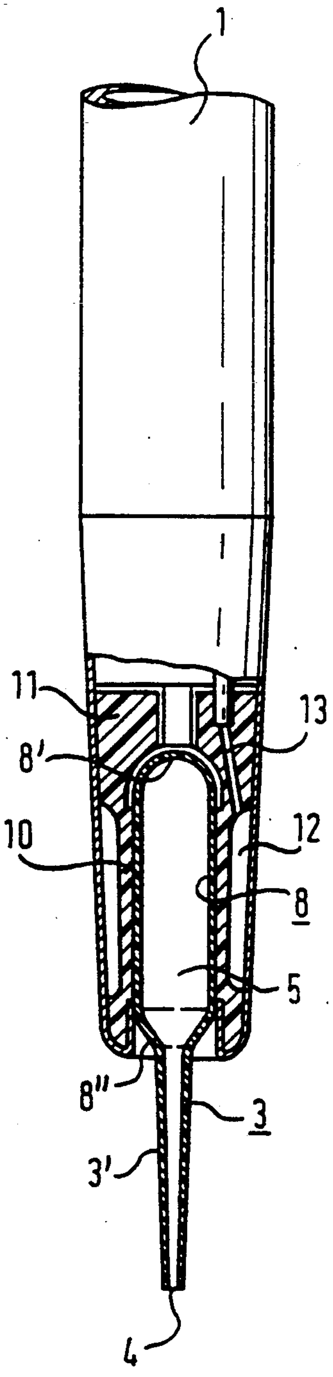
FIG. 4 shows a pipetting apparatus according to the invention in side elevation view and partial longitudinal cut through the reception region for the pipette tip.

According to FIG. 4, the invention conceives a pipette tip 3 which comprises a work volume 5 within a sealed bulb-like deformable portion 8 of cylindrical shape. The deformable portion 8 has a convex end portion 8′ at one end and a convex transit region 8″ at the other end. The transit region 8″ leads to a tip portion 3′ of the pipette tip 3 which tapers towards the tip opening 4. Thus, air or sample material can reach into or out of the tip only through the tip opening 4.

The deformable portion 8 is held in the case 1 in a complementarily formed receptacle 10 of a displacement device 11. The receptacle 10 is supported against the rigid abutment faces of the cage 1. The displacement device 11 is made of a rubber-elastic material which is supported at the case wall circumferentially and at the front face. The displacement device 11 serves not only as receptacle for the pipette tip 3, but is a part of an adjusting device. Therefore, it has an annular chamber 12 adjoining to the including wall of case 1. The annular chamber 12 extends in longitudinal direction of the pipette tip 3 and is connected by a channel 13 to hydraulic devices of the adjusting device, to be discussed below.

The inner walls of the chamber 12 are deformable to the longitudinal axis of the pipetting apparatus by pressure rise in the hydraulic devices, thereby radially compressing the deformable portion 8. Thus, securely holding the pipette tip 3 in the receptacle 10 can be achieved by low prestraining the hydraulic medium and further pressure increase can effect the ejection of a fluid contained in the pipette tip. Pressure reduction leads to an elastic redeformation of the displacement device 11 and the deformable portion 8, whereby the pipette tip 3 draws in through its tip opening 4. The pipette tip 3 can be released by complete reduction of the hydraulic pressure in the chamber 12.

Figure 5A:
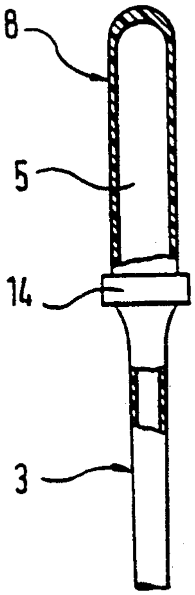
FIGS. 5 and 6 show an integrally formed pipette tip of the apparatus according to the invention in partial longitudinal elevation view and in reduced side elevation view.
Figure 5B:
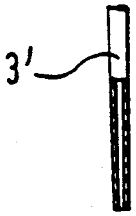
Figure 6:
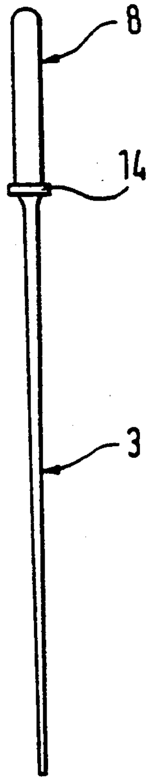

FIGS. 5 and 6 show a pipette tip 3 the tapered tip portion 3′ and cylindrical deformable portion 8 of which being integrally connected to each other in the flange 14. Usually, this requires to make the pipette tip 3 of a deformable material, especially a deformable plastic. As materials for the pipette tips 3 according to FIG. 4 to 6 especially polypropylene and/or polyethylene may serve.

Figure 7:
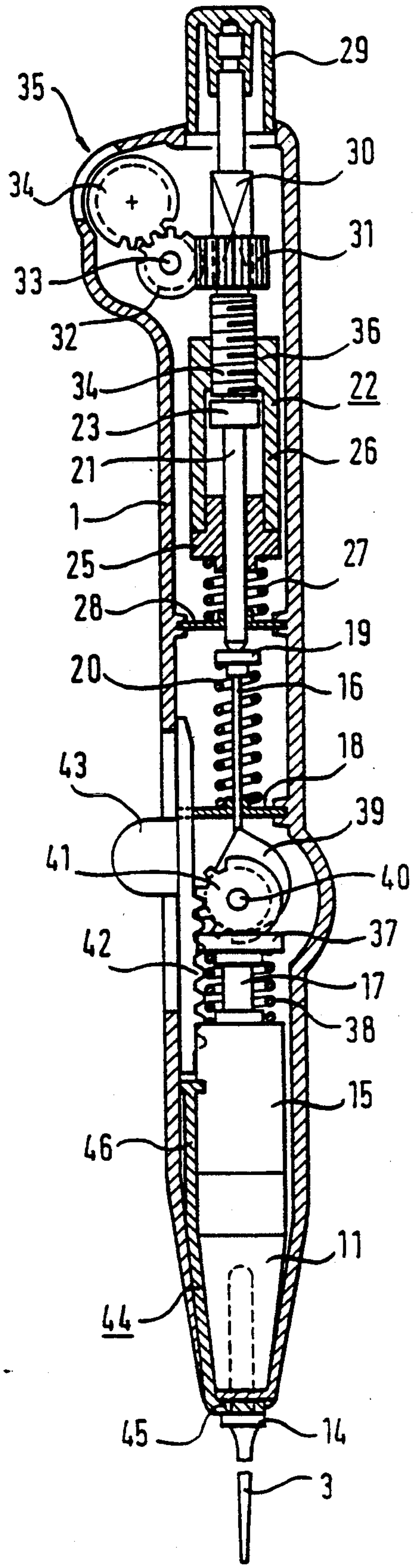
FIGS. 7 and 8 show a pipetting apparatus according to the invention with adjustable stroke limitation and coaxial piston unit with eccentric disc control in longitudinal elevation view and a side elevation view of the upper region.
Figure 8:
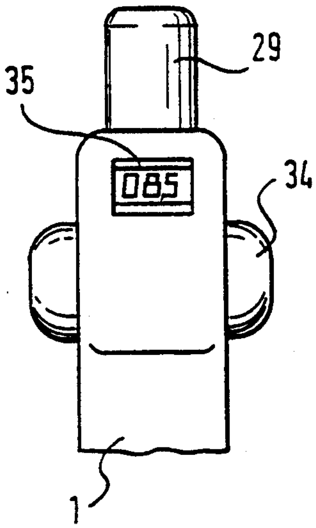

At a pipetting apparatus according to FIGS. 7 and 8 the case 1 receives at its lower end a pipette tip 3 in a displacement device 11 similar to that of FIG. 4. The displacement device 11 adjoins to a cylinder block 15. This contains a cylinder (not shown) for a metering piston 16 and a predeforming piston 17 coaxially surrounding the metering piston. According to FIG. 4, the cylinder is communicatingly connected to a chamber 12 of the displacement unit 11 by a channel 13.

The metering piston 16 is guided in the upper region by a casewardly supported guidance disc 18. A spiral spring 20 is held between a plate 19 at the upper end of the metering piston 16 and the guidance disc 18 which spiral spring acts to press the metering piston 16 out of the cylinder as far as possible at reduction of the hydraulic pressure.

At the other side, plate 19 is supported by a forcing rod 21 which is guided through a stroke limiter 22. It comprises a stop flange 23 being movable between the end flanges 24, 25 of the stroke limiter 22. The letter stop flange 25 is formed as a pull-over stroke stop as it is movable relatively to a sleeve-like mantle portion 26 of the stroke limiter 22. The pull-over stroke stop 25 is supported by another guidance disc 28 being casewardly fixed by another spiral spring 27 and also centering the forcing rod 21. When the stop flange 23 reaches the pullover stroke stop 25 due to actuation of a push button 29 against the effect of the spiral spring 20, both will be further slidable against the additional effect of the spiral spring 27. Thereby the metering piston 16 is allowed to another travel distance, the function of which will be described below.

Further, the path of the metering piston 16 is variable by variation of the position of the upper end stop 24 for the stop flange 23. Hereby, a fundamentally known adjustability of the pipetting volume is possible. Therefore, the upper end stop 24 has a squaring 30 outside the stroke limiter 22, the squaring being guided through a squaring reception of a spur gear 31. The spur gear 31 is rotatable in the case 1 but non-slidably in longitudinal direction. It meshes with a gear wheel 32 being arranged on an adjustment shaft 33 which has adjusting buttons 34 outside the case. The gear wheel 32 also drives a mechanical counter 34 having a display 35 viewable from the outside.

Turning an adjusting button 34 for changing the pipette volume effects by the gear wheel 32 a rotation of the spur gear 31 and thereby of the end stop 24 which is held by an adjustment thread 36 within the stroke limiter 22. Hence, the end stop 24 is shifted axially, sliding with its squaring 30 in the squaring reception of the axially held spur gear 31. Because of the effect of the spiral spring 20, the forcing rod 21 and metering piston 16 are adjoinedly held at the end stop 24 when the push button 29 is not loaded so that a following actuation of the push button gives a changed pipette volume.

The predeforming piston 17 has a disc-like pressure plate 37 at its upper end. Another spiral spring 38 being supported between this pressure plate and the cylinder block 15 presses the predeforming piston 17 out of the cylinder block 15 as far as possible. It forces the pressure plate 37 to abut an arrangement with eccentric discs 39 being arranged on both sides of the metering piston 16. A shaft 40 connects the eccentric discs 39 unrotatably to a spur gear 41 which meshes with a longitudinal toothing 42 of a slider 43.

Spur gear 41 and eccentric disc 39 are driven clockwise by moving the shifter in pipette longitudinal direction away from the pipette tip 3. The eccentricity of the eccentric disc 39 effects pressing the predeforming piston 17 into the cylinder block 15. Hence, the hydraulic pressure inside the chamber of the displacement unit 11 is raised somewhat compressing the pipette tip 3 and the deformable portion and thereby holding it. The contour of the eccentric disc 39 assures that predeformations will lead to self-locking of the predeformation drive and the position of a predeforming piston 17 will be conserved during the following pipetting actions.

At a lower end of the pipetting apparatus is provided an ejector 44 which grips within annular portion 45 under the annular flange 14 of the pipette tip 3. The rod portion 46 of the ejector 44 is guided in the case 1 up to the lower edge of the shifter 43. Therefore, a movement of the shifter 43 towards the pipette tip effects not only a release of the pipette tip 3 due to opposite movement of the predeforming piston 17, but also a shifting of the ejector 44 in the direction of the pipette tip 3 so that the latter is slidably removed from the front end of the pipetting apparatus.

In the following, the pipetting apparatus according to FIGS. 9 and 10 will be described only with regard to those features which are additionally shown or are different to those of FIGS. 7 and 8.

Additionally shown is a liquid sealed connector 47 between the displacement device 11 and cylinder block 15 which comprises a passage channel 48 for the hydraulic liquid from the cylinder 49. In this drawing, it is seen how metering piston 16 and predeforming piston 17 commonly engage in the cylinder 49 and are sealed to that cylinder as well as to each other by means of torroidal seal rings 50, 51.

A distinguished feature is, that the metering piston 16 is integrally formed with forcing rod 21 and is fixed in the push button 29. Accordingly, the spiral spring 20 is provided at a different place, namely between push button 29 and the cup-like spur gear 31 being longitudinally supported. Hereby, the metering piston 16 is also pulled so far out of the cylinder 49 resp. the predeforming piston 17 as the position of the push button 29 allows for.

Also the shifter 43 is formed differently. As is especially shown in FIG. 12, it has notches 52 above on both sides lying on a common axis and being guided by a rail—not shown—of the case 1. Below, it is connected with a forcing rod 54 by a hinge joint 53. Hinge pins of the hinge joint 53 can project into the cabinet rails. Also, the forcing rod 54 is provided below with guidance notches 55 on both sides which engage with the cabinet rails. Further it has below two convex support areas 56 which support at the pressure plate 37 for the predeformation. Slider 43 and forcing rod 34 are formed hollowly, the latter principally consisting of two side parts clamped by a grommet 57. The metering piston 16 is passed through the cavities of the slider 43 and forcing rod 54.

For a predeformation of an inserted pipette tip by rising the pressure of a hydraulic medium, firstly the slider 43 is to slide in the direction of the pipette tip. Thereby, the notches 52 and 55 slide in the cabinet rails until the upper notches 52 reach a groove in the rails. Then, the slider 43 is to rotate around the hinge joint 53 with the notches 52 in the groove. Thereby, the forcing rod 54 principally stays aligned to the pipette longitudinal axis on account of its guidance notches 55, possibly further guidance notches of the hinge joint 53, or a sidely support in the case 1. A certain angular distortion is compensated by the convex frontal areas 56 which roll on the pressure plate 37. In this notch position, the predeformation 17 is pushed into the cylinder 49 and fixed so that the predeforming portion of the pipette tip is sufficiently radially pressed.

Finally, this pipetting apparatus comprises a different ejector 44 with an annular portion 45, whereby a prolonged ejector rod 46 is guided to a slider-like ejection organ 58.

Figure 9:
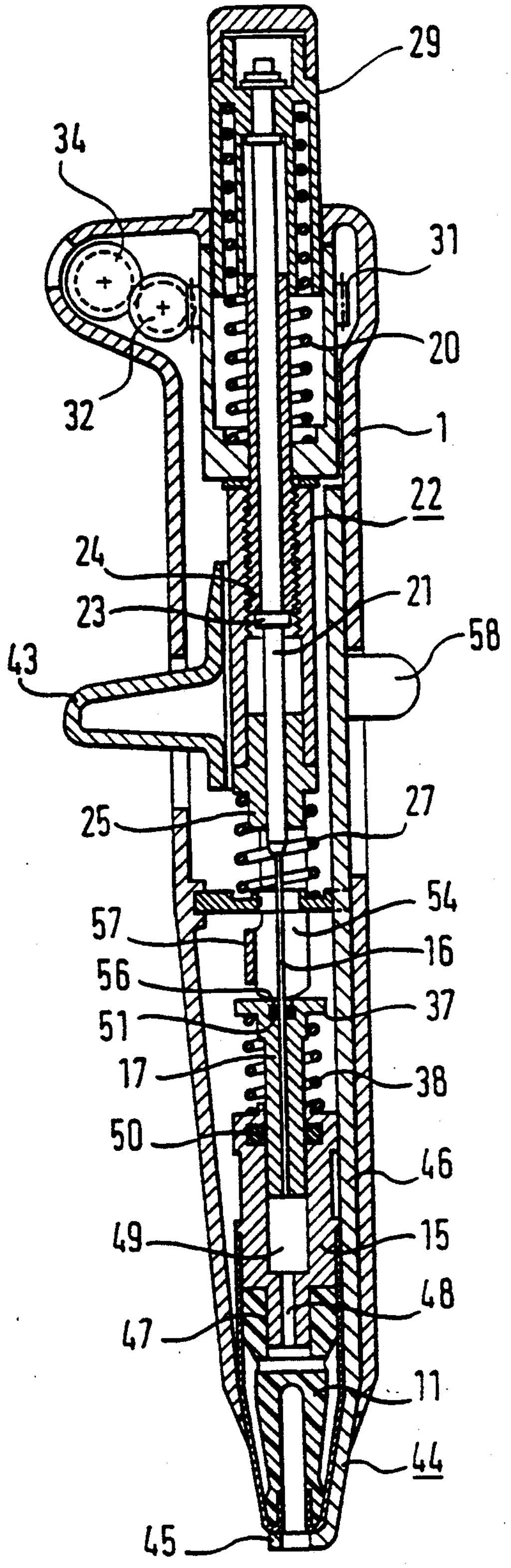
FIG. 9 shows a pipetting apparatus according to the invention with a push-rod-controlled piston in longitudinal elevation view.
Figure 10:
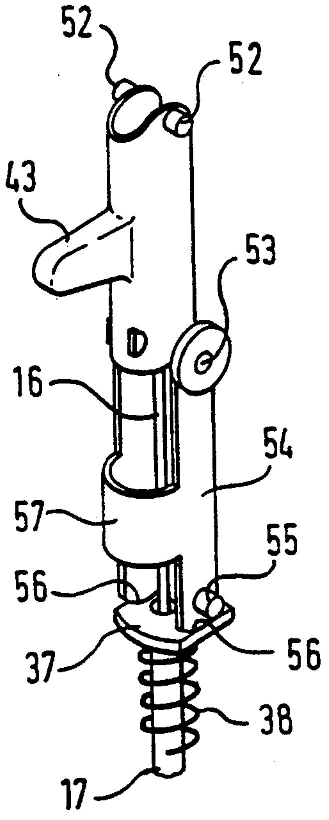
FIG. 10 shows a piston control of the same pipetting apparatus in enlarged perspective elevation view.
Figure 11:
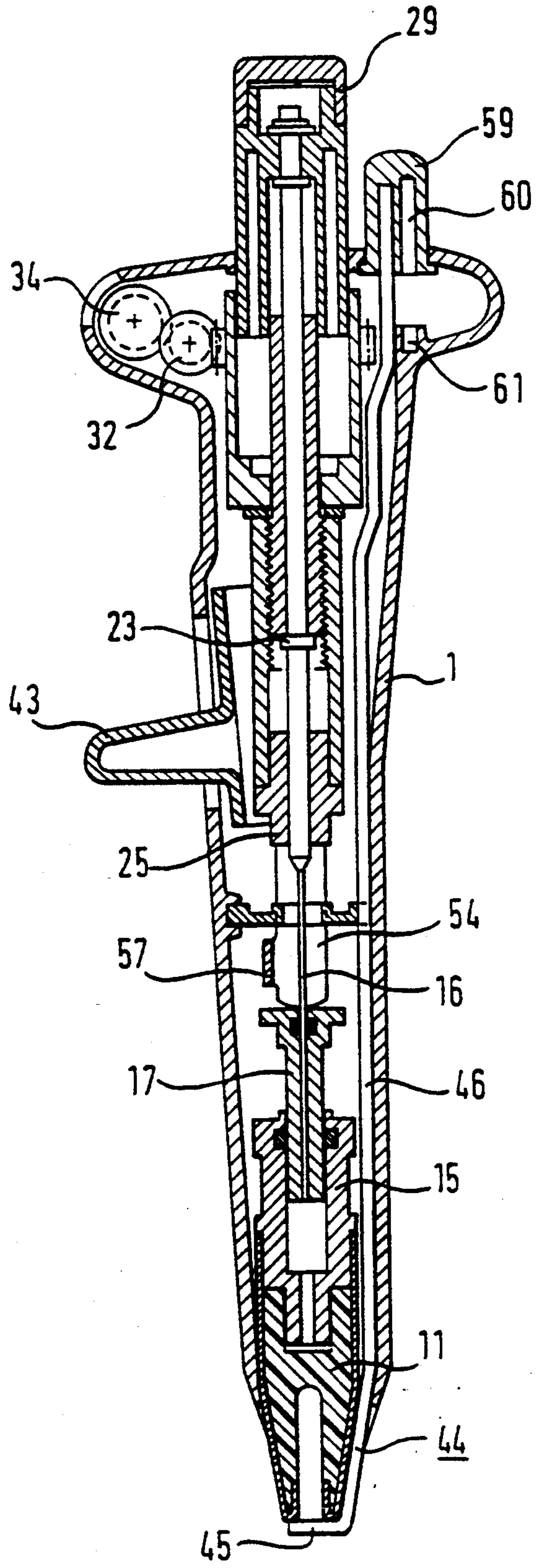
FIG. 11 shows a pipetting apparatus according to the invention with modified ejector according to FIGS. 9 and 10 in longitudinal elevation view.

The pipetting apparatus according to FIG. 11 differs from the one in FIGS. 9 and 10 principally by the ejection mechanism the ejector rod 46 of which reaches up to the push button 29 and is there connected to a push button-like ejection organ 59. The latter has a pocket bore 60 for improved straight guidance which is aligned to a pin bore 61 of the case 1 and a guidance pin—not shown. For reason of clearness, the spiral spring for retracting the pistons 17, 16 and the pull-over stroke stop 25 are omitted in this drawing.

The predeformation mechanic of this version corresponds to that according to FIGS. 9 and 10, whereby the slider 43 is drawn in pivoted stop location. The drawing demonstrates that this does not affect the alignment of the forcing rod 54 along the longitudinal axis.

Figure 12:
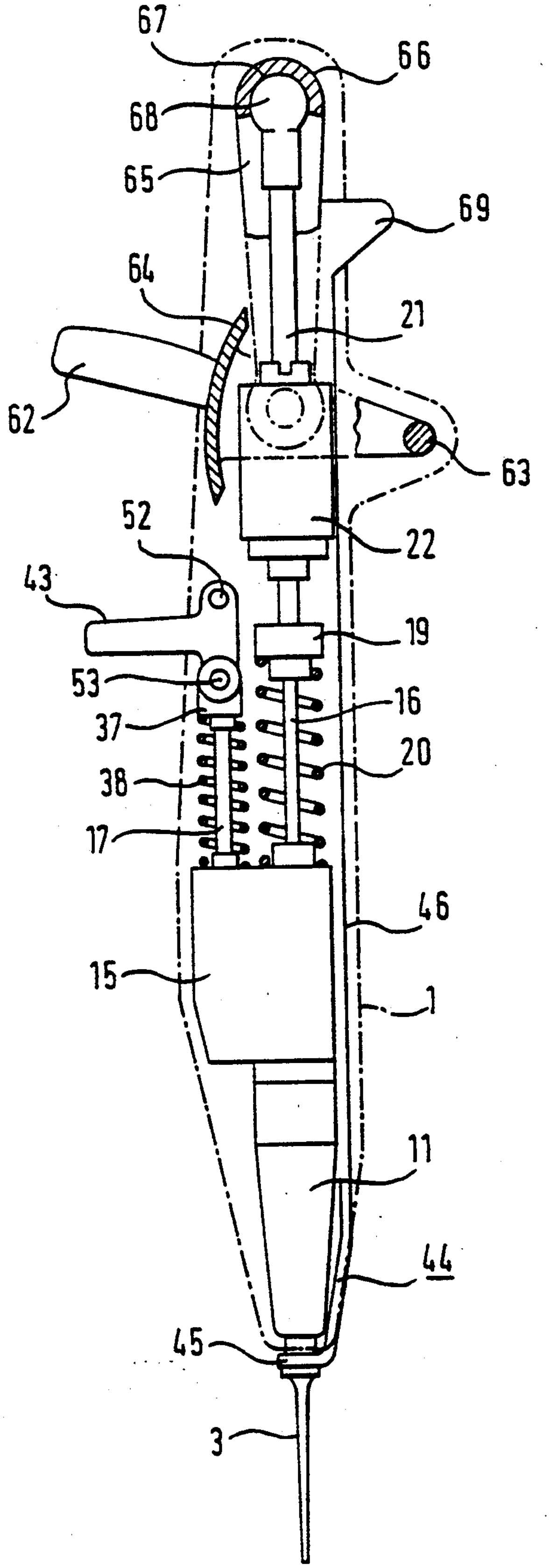
FIG. 12 shows a pipetting apparatus according to the invention with parallel arranged piston and metering lever in longitudinal elevation view.
Figure 13E:
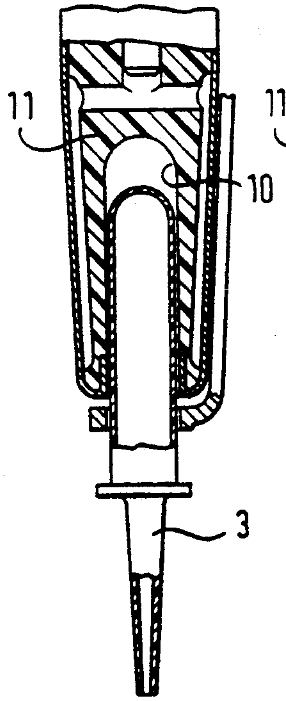
Figure 13E:
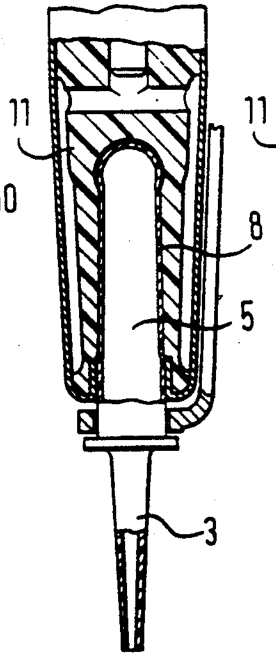
Figure 13E:
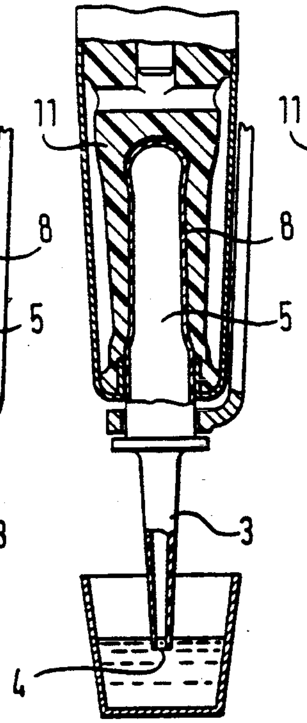
Figure 13E:
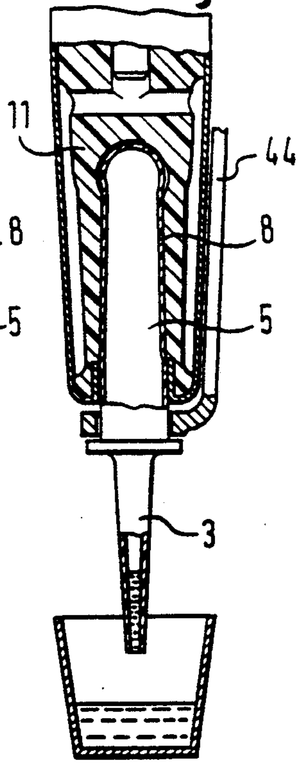
Figure 13E:
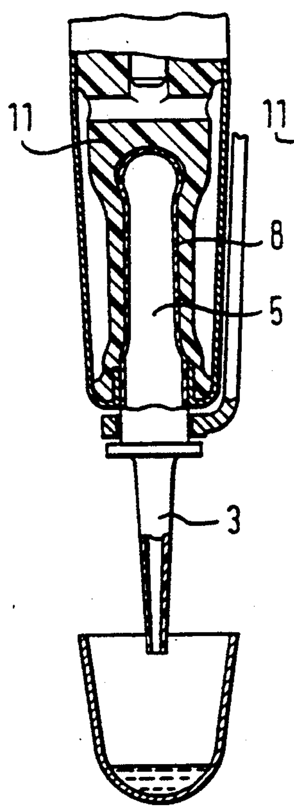
Figure 13F:
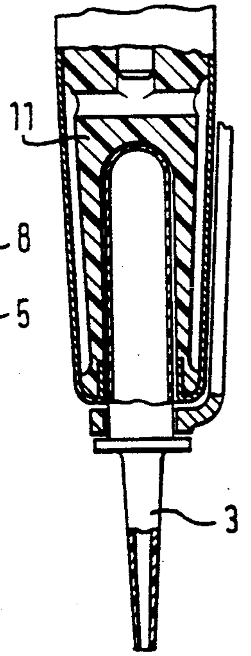
Figure 13G:
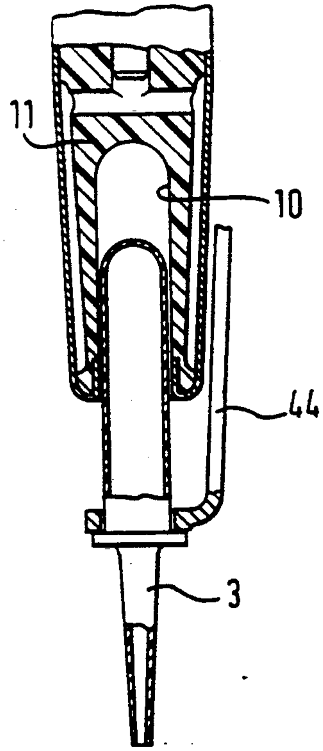
Figure 14:
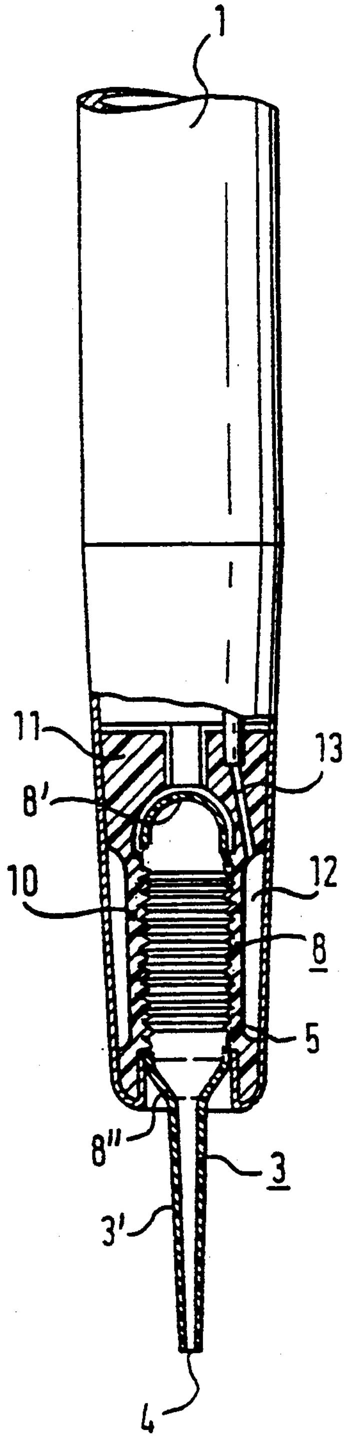
FIG. 14** shows a part-sectional cut through the reception region with the pipette tip of a pipette apparatus according to the invention showing a bellow-like shape of the deformable portion of the pipette tip.

The pipetting apparatus in FIG. 12 has a cylinder block 15 in the case 1 adjoining to the displacement device 11 which cylinder block comprises two cylinders—not shown. On the right hand side in the drawing, a metering piston 16 engages in a cylinder, the metering piston having above a plate 19 for supporting a prestrained spring coil 20. Corresponding to FIG. 9, a forcing rod 21 being guided through a stroke limiter 22, supports at the plate 19. But the stroke limiter 22 has fixed end stops so that neither a pull-over stroke nor a variation of the pipette volume are possible.

For the actuation of the metering piston 16 is provided a one-sided metering lever 62 which's bearing 63 is arranged at the side of case 1 opposite to its case exit. By means of a rotor shield 64 its case exit is protected against the entering of foreign particles. With two parallel lever portions, the metering lever 62 is guided on both sides along the forcing rod 21 and stroke limiter 22, whereby these lever portions articulately bear a yoke 65 also having side parts on both sides of the forcing rod 21. The side parts are connected above by a transverse 66 comprising a sphere 67 for receiving a ball-shaped head 68 at the upper end of the forcing rod 21.

When the metering lever 62 is actuated in direction towards the inserted pipette tip 3, the yoke 65 pulls down the forcing rod 21 which influences the hydraulic pressure in the displacement unit 11 by the metering piston 16. Thereby, the hinges on both ends of the yoke 65 compensate the angular distortion.

On the left hand side in the drawing a predeforming piston 17 is introduced into the cylinder block 15 which predeforming piston is supported parallel to the metering piston 16. Above the predeforming piston 17 carries a plate 37, whereby a spiral spring 38 is provided between plate and cylinder block. The latter also effects the predeforming piston 17 to be pulled out of the cylinder block 15 as far as possible.

At the same time, the plate 37 forms a forcing rod and comprises above a hinge joint 53 to the slider 43 which's sidewardly protruding hinge pins are guided in the rails of case 1. At the same time, the slider 43 projects into the cabinet rails with notches 52 on both sides. If it is shifted in the direction of the pipette longitudinal axis towards the pipette tip 3, the notches 52 finally reach a groove in the cabinet rails in which they are lockable by pivoting the slider 43. Then, the predeforming piston has reached a position in which a sufficient hydraulic pressure is reached in the according cylinder which is connected to the chamber of the predeforming device 11 by a hydraulic channel as is the cylinder for the metering piston 16.

Also in this version, an annular portion 45 of an ejector 44 engages with an annular flange of the pipette 3. An ejector rod 46 is guided until close to the upper end of the pipetting apparatus where it is connected to an ejection slider 69. In this version, the actuation elements are arranged especially ergonomically.

FIGS. 13a–13g show a contamination-free pipetting apparatus in different phases of operation which are denominated by arabic numbers. In operation phase 1, a pipette tip 3 is slidably inserted into the receptacle 10 of the displacement device 11. Phase 2 denominates the prestraining of the pipette tip 3 by predeforming the deformable portion 8 in radial direction inwardly. Phase 3 shows the displacement of the metering volume from the pipette tip 3 due to further deformation of the deformable portion 8 and work volume 5 which is carried out appropriately with dived tip opening 4. In phase 4 recepting the liquid is already finished, whereby the deformable portion 8 is partly redeformed. Partial drawing 5 relates to the liquid ejection into a provided receptacle which is associated with a newly compression of the deformable portion 8 and working volume 5 including a pull-over stroke. Finally, phase 6 shows the pipette tip 3 after complete removal of stress to the displacement unit 11 and phase 7 shows the ejection operation which is associated with a shift of the ejector 44.

I claim:

1. A pipetting apparatus comprising:

a case (1) having a front end and a rear end and a receptacle (10) located within the front end of the case (1), the receptacle having an opening for shoving in a pipette tip (3) from outside of the front end;

the pipette tip (3) having a deformable portion (8) formed by a continuous wall and having a work volume (5), within the wall of the deformable portion, the deformable portion being shoved in the front end of case (1);

the (a) pipette tip (3) further having a tip portion (3') formed by a continuous wall having a front end and a rear end, the walls located at the rear end of the tip portion being integral with the walls located at the front end of the deformable portion (8) such that a fluid can flow from the deformable portion of the pipette tip and the front end of the tip portion having a tip opening (4);

the distance between a first wall portion and an opposite wall portion of the deformable portion being greater than the distance between a first wall portion and an opposite wall portion of the tip portion (3');

the deformable portion (8) being surrounded by the receptacle (10) having an inside contour matching to an outside contour of the deformable portion (8), and the tip portion (3') projects away from the receptacle (10) and out of the front end of the case (1);

a displacement device (11) made of elastic material, the receptacle (10) being part of the displacement device and the displacement device being part of an adjusting device (11, 15, 16, 21), having a front end and a rear end, the front end of the adjusting device (11, 15, 16, 21) including the displacement device (11) and the rear end being connected to an actuating device (29);

in a first position, the actuating device being preactuated and the adjusting device (11, 15, 16, 21) comprises predeformation means (43, 17), which compresses the deformable portion (8) and securely fix the deformable portion in the receptacle (10) while compensating for misalignments between the deformable portion (8) and the adjusting device (11, 15, 16, 21); and in a second position, the actuating device being released whereby the compression of the deformable portion (3) is released.

2. An apparatus according to claim 1, characterized in that the deformable portion (8) has a bulb-like, cylindrical and/or bellow-like shape.

3. An apparatus according to claim 2, characterized in that the deformable portion (8) is cylindrical and has a convex end region (8') at one end and a convex transit region (8") towards the tip portion (3) at its other end.

4. An apparatus according to claim 3, characterized in that the adjusting device comprises a metering cylinder (49) with a metering piston (16) guided therein which is shovable by the actuating device (29) for deforming the deformable portion (8).

5. An apparatus according to claim 3, characterized in that the actuating device (29) is linked with a metering piston (16) by a linkage (21), that the linkage (21) has a stroke limiter (22) comprising a linkage-fixed stop flange (23) and end stops (24, 25) on both sides of the stop flange case-sidely spaced apart from each other, and that the distance of the end stops (24, 25) is variable by means of an actuating gear (31, 32, 22, 24).

6. An apparatus according to claim 4, characterized in that the adjusting device have a predeforming piston (17) for predeforming the deformable portion.

7. An apparatus according to claim 6, characterized in that the predeforming piston (17) and the metering piston (16) are guided side-by-side parallel to each other within a predeformation cylinder and a metering cylinder.

8. An apparatus according to claim 6, characterized in that the predeforming piston (17) and the metering piston (16) are arranged coaxially within a common cylinder (49).

9. An apparatus according to claim 8, characterized in that the metering piston (16) and/or the predeforming piston (17) act on the deformable portion (8) by means of a displacement fluid.

10. An apparatus according to claim 3, characterized in that the deformable portion (8) is made of an incompressible and elastic material.

11. An apparatus according to the claim 1, characterized in that the pipette tip (3) comprises an annular flange (14) between the deformable portion (8) and the tip portion (3').

12. An apparatus according to claim 11, characterized in that the ejector (44) abuts to the annular flange (14) of the pipette tip (3) with a ring portion (45).

13. An apparatus according to claim 1, characterized in that the displacement device (11) is supported at its outside by rigid abutment areas of the case (1).

14. An apparatus according to claim 1, characterized in that the displacement device has at least one chamber (12) for displacement fluid, and in that the chamber (12) is extended around the receptacle (10) for introduction of the pipette tip (3').

15. An apparatus according to any of the claims 1, 2 and 3, characterized in that the pipette tip (3) has a conical tip portion (3').

16. An apparatus according to any of the claims 2 and 3, characterized in that tip portion (31) and deformable portion (8) are integrally connected to each other to form a unit.

17. An apparatus according to any of the claims 2 and 3, characterized in that an ejector (44) engages with the pipette tip (3), which ejector is actuable by an ejection organ (43, 58, 59) and shifts the pipette tip into a release position when actuated.

* * * * *